Jan. 17, 1956 — L. E. PURMORT — 2,731,156

FILTER LEAVES

Filed April 26, 1954

INVENTOR
LOUIS E. PURMORT
BY
*Mason & Graham*
ATTORNEYS

United States Patent Office 2,731,156
Patented Jan. 17, 1956

2,731,156
FILTER LEAVES
Louis E. Purmort, Lynwood, Calif.

Application April 26, 1954, Serial No. 425,353

1 Claim. (Cl. 210—195)

This invention has to do with filters, and relates to improvements in filter leaves for that type of filter in which a plurality of filter leaves are mounted upon a tubular shaft in a closed drum, the liquid to be filtered being introduced into the drum under pressure, after which it passes into the filter leaves and thence outwardly through the shaft.

Heretofore, filter leaves for such filters have presented a considerable problem inasmuch as the conventional construction of such leaves has been to provide a hub from which metal spokes radiate to a rim, the spokes being welded to the hub and rim. To produce such a filter leaf requires considerable welding, which is objectionable not only from the manufacturing expense involved but the liquids to which such devices are usually exposed are usually highly corrosive in nature. Consequently, prior devices of this character have prevented problems of cost, corrosion and electrolysis. Also, the spokes in such filter leaves tend to restrict the flow of the filtered liquid.

It is an object of my invention to provide a filter leaf which eliminates the necessity for welding parts together and eliminates the necessity for spokes.

It is a further object to provide a filter leaf which incorporates a protective retaining ring or guard which not only strengthens the structure but also protects the filter leaves when they are laid flat such as occurs when they are being stored.

Other objects and corresponding advantages will appear hereinafter.

For the purpose of explaining my invention, I shall now describe in detail a presently preferred embodiment thereof, but in doing so I wish it understood that I do not intend thereby to limit the broader scope of my invention, except as may appear from the appended claims. In the following description, I shall refer to the accompanying drawings, wherein Fig. 1 is a side elevation, with parts broken away for illustrative purposes;

Figure 1:
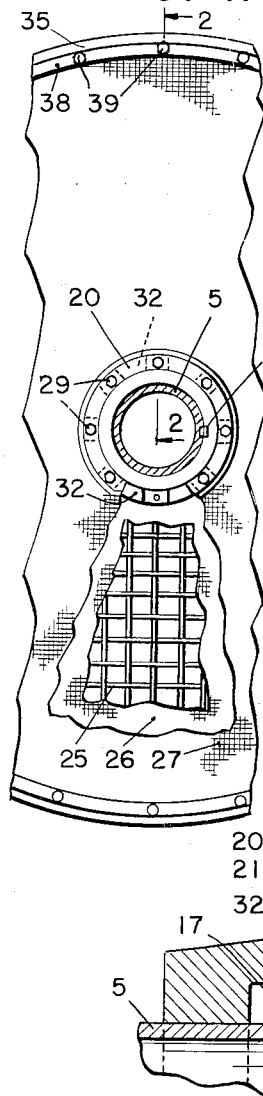

The type of filter in which my filter leaves are generally used comprises a closed drum (not shown) having an inlet for the liquid to be filtered and having a plurality of filter leaves mounted on a tubular shaft disposed axially of the drum. Such a shaft is denoted in the drawings by the numeral 5. The liquid introduced into the drum passes through the screens of the filter leaves and thence outwardly through the tubular shaft, the hub of the filter leaf having openings communicating with radial openings in the shaft. In some forms of said filter devices, the shaft 5 is rotatably mounted so that the filter leaves may be cleaned by rotating them relative to cleaning sprays in the drum.

My improved filter leaf comprises a hub 15 in whose inner surface there is an annular recess 17 communicating with radial openings 19 in the shaft. The hub is keyed to the shaft at 18 and has an annular radial flange 20 provided with circumferentially spaced transverse holes 21.

The filter leaf has a center screen 25 comprised of wire of a character and gage which will provide adequate strength against lateral flexure.

Disposed at each side of the center screen 25 I provide a small fine-meshed inner screen 26, and an outer screen 27, which latter screen is preferably of finer mesh than that of screen 26.

The described screens are secured to the hub by being clamped between flange 20 and ring 28, the flange and ring being secured in such clamping position by circumferentially spaced bolts 29. Metal backing rings 30 are employed one against the inner peripheral surface of each of the screens 27.

Circumferentially spaced spacer blocks 32 are interposed between the rings 30 at the inner peripheries of the screens, the liquid which passes into the filter leaves passes out through the spaces between the blocks 32 and thence outwardly through radial openings 33 in the hub.

To secure the outer peripheral portions of the screens together I provide a relatively substantial rigid rim 35, whose sides 36 converge to parallel portions. Rings 38 and bolts 39 secure the parts in assembly.

Figure 2:
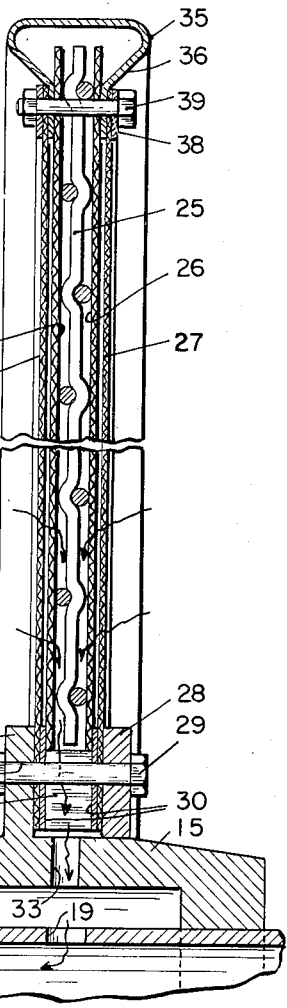
Fig. 2 is an enlarged section taken on line 2—2 of Fig. 1.
Figure 3:
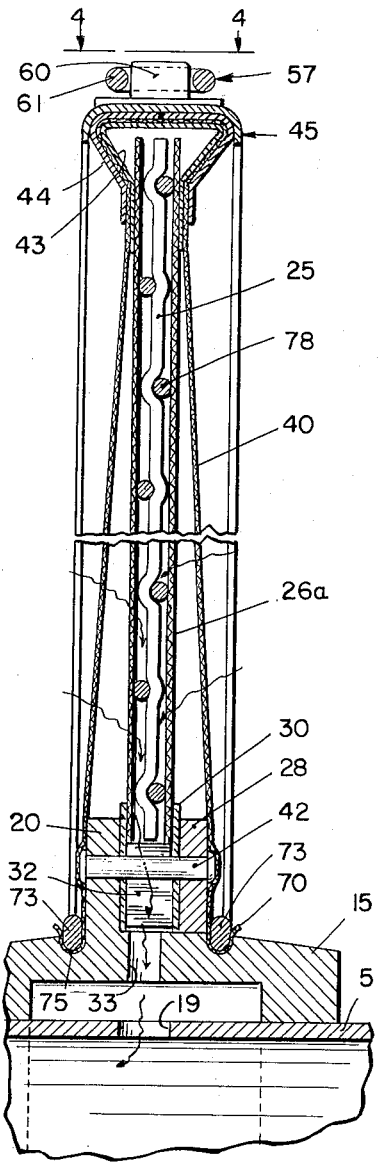
Fig. 3 is a view similar to Fig. 2 but showing a modified construction.
Figure 4:
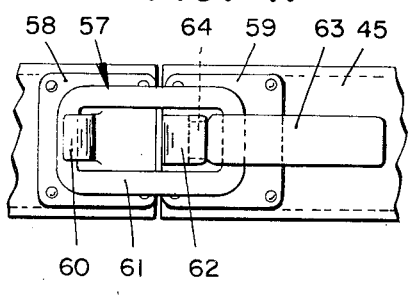
Fig. 4 is a view taken on line 4—4 of Fig. 3.

In the embodiment of Fig. 3, I show a center screen 25a like that shown in Fig. 2, relatively fine inner screens 26a and outer screens 40, which latter screens are preferably of a suitable plastic or fabric.

The inner peripheries of screens 25a and 26a are clamped between flange 20 and ring 28 by rivets 42. The outer peripheral portions of screens 40 are clamped between clamping rings 43, 44, over which is mounted a split ring 45.

The ends of ring 45 are held in position drawn together by an over-center clamp member generally noted 57. This clamp member comprises plates 58, 59 riveted to the respective ends of ring 45. Plate 58 has an overhanging projection 60 engaged by O-shaped link 61.

Plate 59 carries an overhanging projection 62 and link 57 as one of its legs pivotally passes through a lever arm 63, whose relatively narrow inner end 64 engages beneath projection 62 when lever 63 is pressed towards the ring 45.

The inner peripheral portions 70 of screens 40 are drawn taut and held by snap rings 73 which press the screen portions 70 into annular grooves 75 in the hub.

Figure 5:
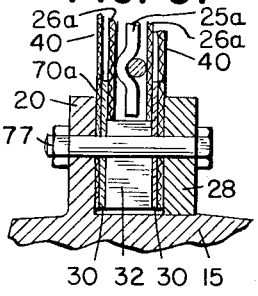
Fig. 5 is a fragmentary section showing a further modification.

The embodiment of Fig. 5 is the same as that of Fig. 3 except that instead of using the snap rings 73 as before described, the inner peripheral portions 70a are clamped between backing rings 30 and flange 20 and ring 28, the assembly being maintained by bolts 77.

From the foregoing description, it would be observed my filter leaves may be constructed and assembled without welding and all the parts may be separately replaced when desired. All welded or integral spokes are eliminated by virtue of the center screen element which really performs no screening function but may be made of wire which, although heavy enough to provide adequate rigid support for the screens, is small enough to eliminate objectionable interference with free passage of liquid filtered through the screens, the circumferential strands 78 of the center screen providing the necessary reinforcement and spacing of the radial strands. The relatively wide or thick peripheral portions provided by the described rings enable the screens to be laid horizontally when not in use in the filter without damage to the screen elements themselves.

I claim:

A filter comprising a hub having a radial passageway, said hub having a radial, annular flange, a radially disposed reticulated core member carried by said hub, a pair of radially disposed relatively fine meshed screen members carried by said hub one against each side of said core member, said core member and said screen members defining an annular outlet chamber communicating with said passageway, annular means closing the periphery of said outlet chamber, and means clamping the inner peripheries of said screen members against said flange, said last-mentioned means including a clamp ring, a plurality of spacer blocks circumferentially spaced around the hub between said ring and said flange, a backing ring on each side of said spacer blocks, said screen members being received between the backing ring and said flange and said clamp ring respectively, and securing means passing through said clamp ring, said backing rings and said spacer blocks.

References Cited in the file of this patent

UNITED STATES PATENTS

| | | |
|---|---|---|
| 1,344,215 | Sweetland | June 22, 1920 |
| 1,726,035 | Loew | Aug. 27, 1929 |
| 1,818,623 | Holcomb | Aug. 11, 1931 |
| 1,967,070 | Walker | July 17, 1934 |
| 2,207,618 | Grill et al. | July 9, 1940 |
| 2,443,087 | Ulrich | June 8, 1948 |

FOREIGN PATENTS

| | | |
|---|---|---|
| 629,059 | France | Nov. 3, 1927 |
| 647,095 | France | June 9, 1932 |
| 617,677 | Great Britain | Feb. 9, 1949 |